July 26, 1960  J. H. COULTER, JR., ET AL  2,946,669
CHEMICAL AND HEAT RECOVERY APPARATUS
Filed June 10, 1957  4 Sheets-Sheet 1

INVENTORS
James H. Coulter, Jr.
BY Lowell E. Johnson
ATTORNEY

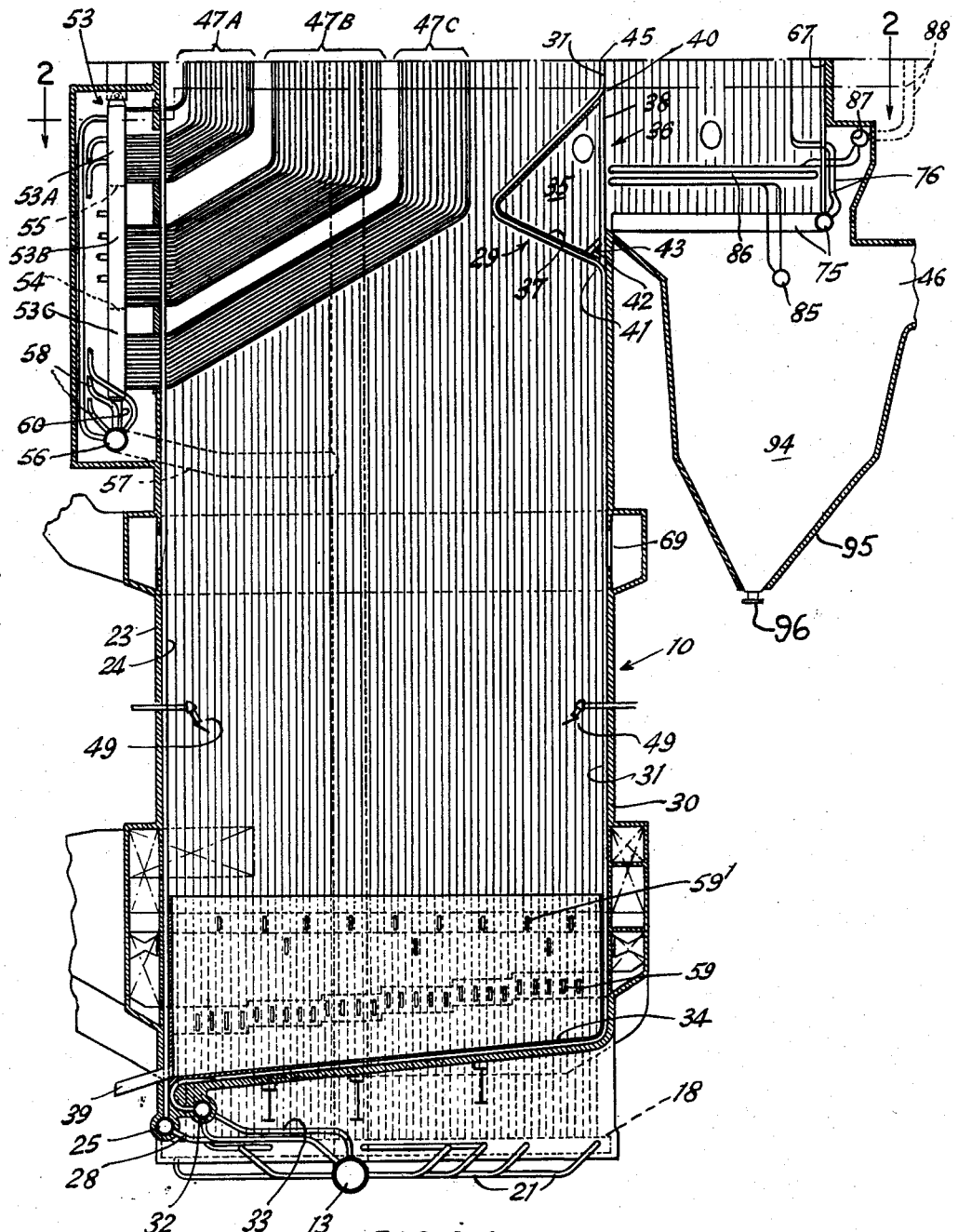
FIG. 1-A
INVENTORS
James H. Coulter, Jr.
BY Lowell E. Johnson
ATTORNEY

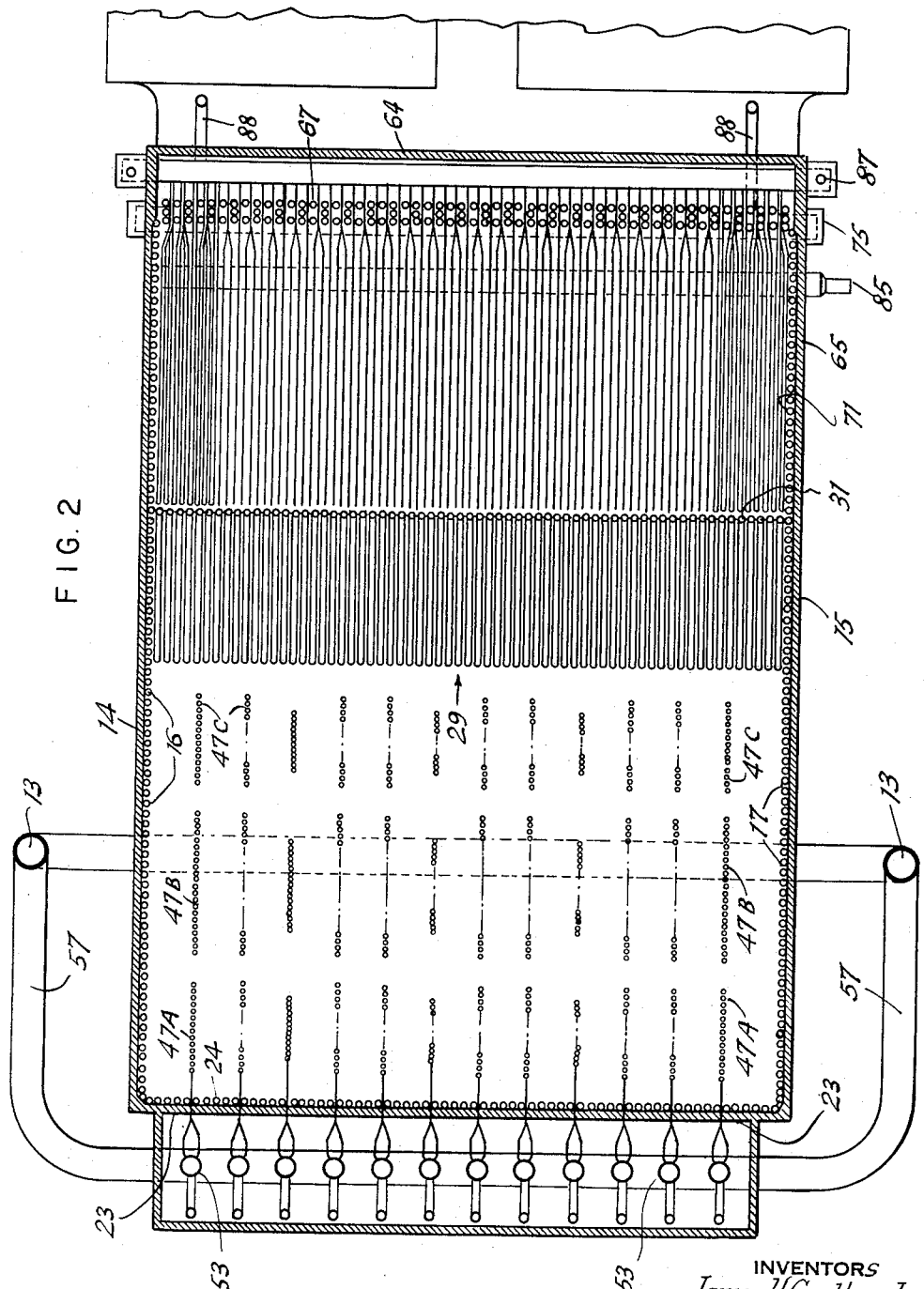

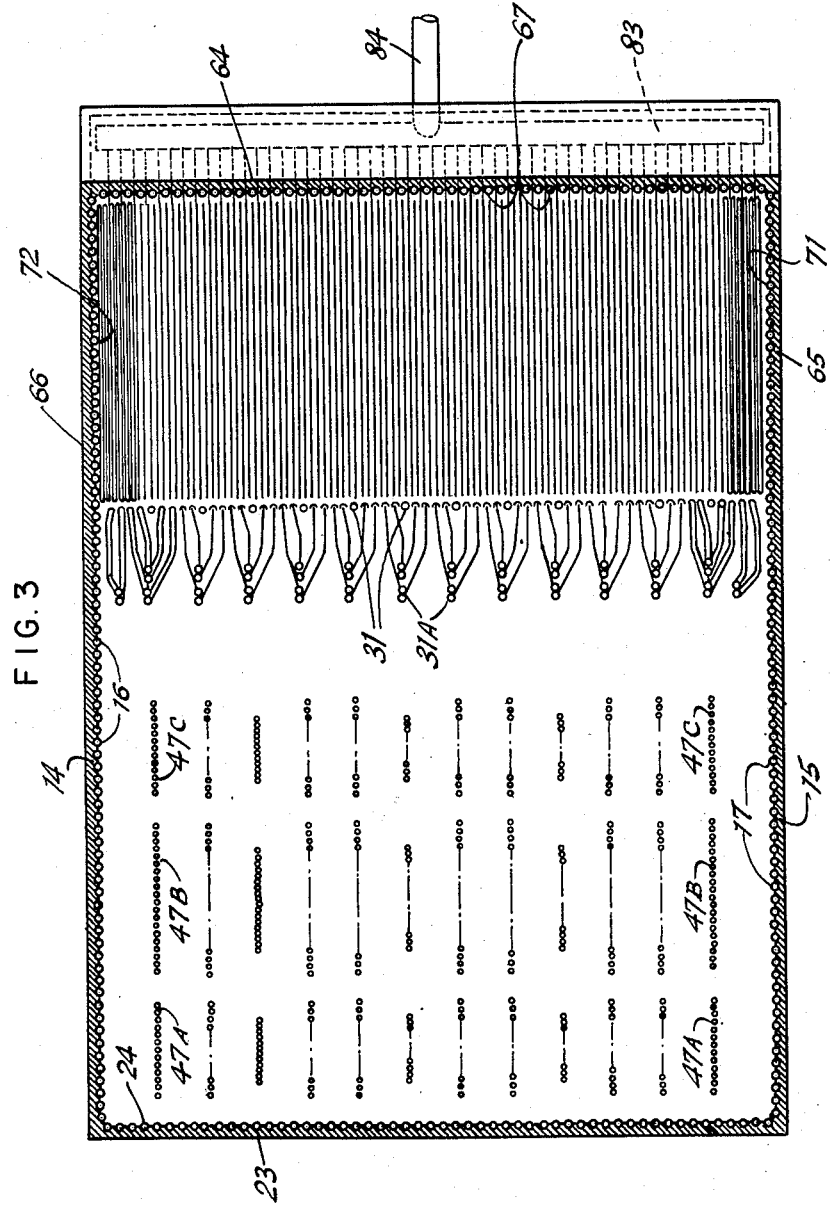

United States Patent Office 2,946,669
Patented July 26, 1960

2,946,669

CHEMICAL AND HEAT RECOVERY APPARATUS

James H. Coulter, Jr., Franklin Square, N.Y., and Lowell E. Johnson, Alliance, Ohio, assignors to The Babcock & Wilcox Company, New York, N.Y., a corporation of New Jersey Filed June 10, 1957, Ser. No. 664,780

2 Claims. (Cl. 23—277)

The present invention relates to the recovery of chemicals and heat from residual pulp liquor containing inorganic chemicals and combustible organic matter, and more particularly to an improved vapor generator of the general type shown in U.S. Patent 2,416,462, and constructed and arranged for high chemical and heat recovery efficiencies.

The recovery of chemicals and heat from the residual liquor of the pulp digesters in the sulphate or "kraft" pulp industry is well known. In general terms, the residual liquor from the digesters is concentrated by evaporation and incinerated in a chemical recovery furnace where the organic constituents of the liquor are burned under controlled combustion conditions to reduce the inorganic chemicals which are removed from the furnace in molten form. The hot gaseous products of the liquor combustion are cooled by heat exchange surfaces positioned in the flow path of the gases, and thereby generate and superheat steam.

The gaseous products of liquor incineration contain mechanically entrained solids and a considerable amount of chemicals which are evaporated, volatilized, or sublimed under normal furnace conditions. The volatilized or sublimed chemicals tend to solidify on heat absorbing surfaces as the temperature of the gases is reduced by heat absorption therefrom, and to entrap the mechanically entrained solids on the heat absorbing surfaces. Since the deposits of chemicals on the heat absorbing surfaces tend to accumulate, the heat transfer efficiencies and pressure drop characteristics of gas flow through the unit are adversely affected.

In the hotter portions of a chemical recovery furnace, the chemical deposits on the heat exchange surfaces will be in a molten or semi-molten state and will tend to drip or otherwise run off from the surfaces contacted by the hot gases. In the cooler portions of the furnace, the chemical deposits will be in a dry or semi-dry state and accumulations of such chemicals will peel off or shed from the surfaces of the heat recovery unit either by gravity or as removed by mechanical means such as soot blowers, vibrators, or the like. In some portions of the furnace, the solid chemicals may shed from the heat exchange surfaces as chunks or slabs and overlay and divert the heating gas flow from any heat exchange surfaces upon which the solid chemicals are deposited.

It has been found that the chemicals deposited upon relatively high temperature heat exchange surfaces are corrosive, particularly when such chemicals are in a molten or semi-molten condition. Heretofore, the problem of corrosion of heat exchange surfaces has not been particularly serious in chemical recovery furnaces since the vast majority of such recovery units have not involved high superheated steam temperatures. Some of the more recent installations, however, are constructed for the production of superheated steam having temperatures approaching and even exceeding 900° F. Under such conditions, it is important to construct and arrange the heat exchange surfaces so as to avoid contact of high temperature gases containing the corrosive chemicals in a molten or semi-molten form with the steam superheating surfaces.

In accordance with the invention, an improved apparatus is provided for chemical and heat recovery wherein the heat is recovered in the form of highly superheated steam and the unit is maintained in a high heat transfer condition by effective chemical cooling and separation of the chemicals from the heating gases. This is accomplished by providing a plurality of rows of laterally spaced pendant platens which are arranged in the upper portion of the chemical recovery furnace and cooperate with a gas deflecting baffle to cool the combustion gases rising in the furnace by radiant heat absorption. The platens and the walls of the furnace are substantially vertical and are generally self-cleaning so that highly efficient heat transfer therein can be maintained over long periods. The partially cooled gases pass through a forwardly inclined screen of water cooled tubes which extend across the gas outlet from the furnace. The screen is in superimposed relationship to an unobstructed furnace space for free fall of separated chemicals which may be intercepted by the screen tubes and shed therefrom in solid chunk form. The partially cooled hot gases of combustion passing the screen enter a convection gas pass where further heat is absorbed in horizontally disposed rows of steam superheating tubes and tubular economizer elements before the gases pass to direct contact liquor evaporating devices. With the heating gases cooled in the furnace to a temperature below the molten chemical temperature before passing over the convection heating tubes, the latter tubes are not seriously affected by corrosion and can be maintained in a substantially clean, highly efficient heat transfer condition by shot cleaning.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of the invention.

Of the drawings:

Fig. 1A is an elevation, in section, of the lower portion of the unit shown in part in Fig. 1;

Fig. 2 is a view, in section, taken on the line 2—2 of Fig. 1A; and

Fig. 3 is a view, in section, taken on the line 3—3 of Fig. 1.

Figure 1:
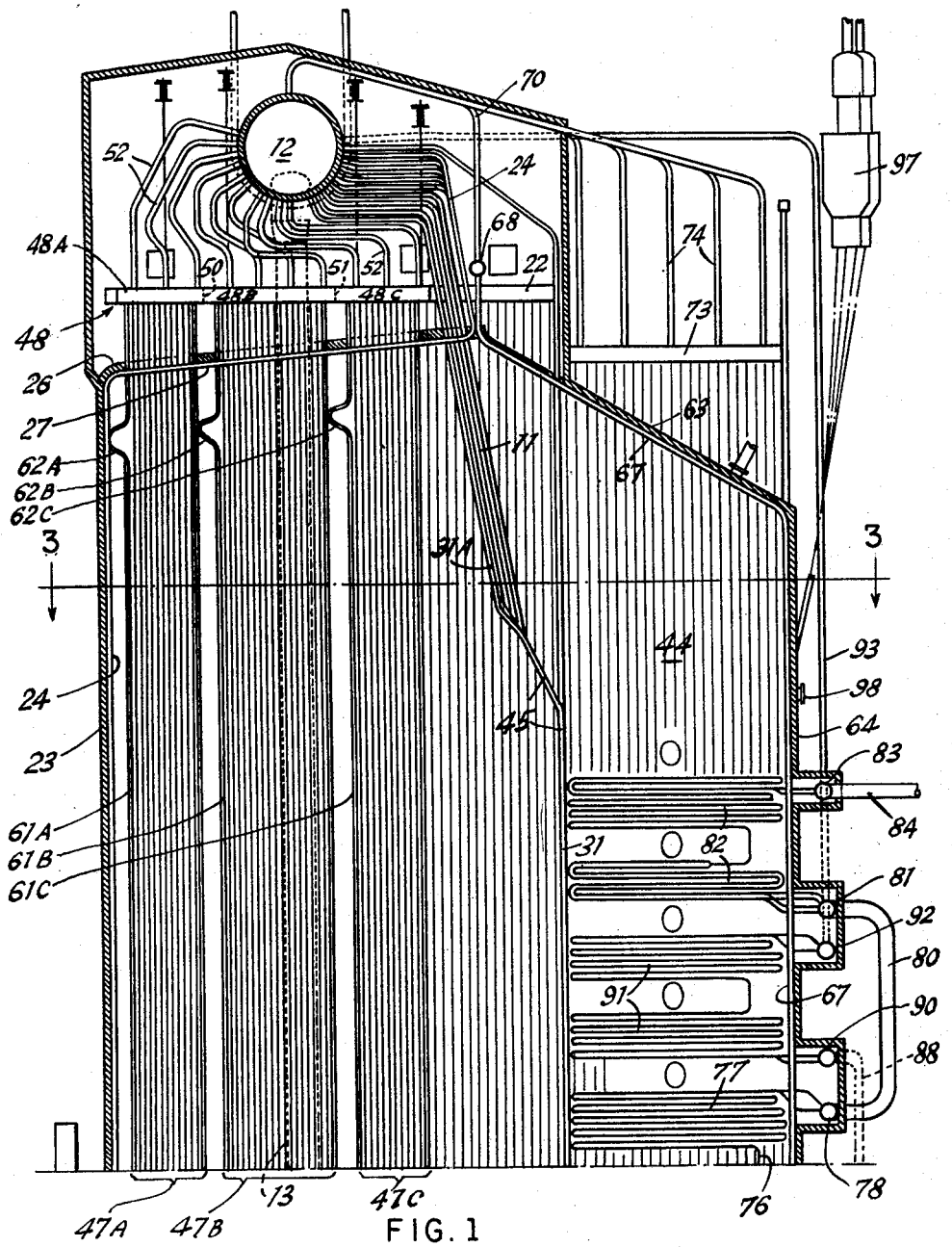
Fig. 1 is an elevation, in section, of the upper portion of a chemical and heat recovery unit constructed and arranged in accordance with the present invention.

In the present embodiment of the invention, a chemical and heat recovery unit of large capacity is shown wherein pulp residual liquor is incinerated with the recoverable inorganic chemicals in the liquor drawn from the lower portion of the unit in the form of a liquid smelt. The heat of combustion of the organic constituents of the liquor not only is used in the reduction process, but also to generate superheated steam for process and/or power purposes.

As shown in the drawings, the unit includes an upwardly elongated furnace 10 of generally rectangular horizontal cross-section having water cooled tubes in the walls, and having a gas outlet 11 in the upper portion thereof. The water cooled tubes of the walls are connected into a circulatory system including a steam and water drum 12 positioned above the furnace 10, external downcomers 13 opening from the opposite ends of the drum and a plurality of transverse headers receiving fluid from the downcomers 13 for supply to the lower ends of the wall tubes.

The side walls 14 and 15 of the furnace are each formed of tube and refractory construction where tubes 16 and 17, respectively, have their lower ends opening to headers 18. The headers 18 receive fluid from the downcomers 13 through connecting pipes 21. The upper ends of tubes 16 and 17 open to headers 22 connected with the drum 12.

The front wall 23 is also formed of tubes and refractory construction including a row of tubes 24 extending upwardly from a lower header 25 to the upper portion of the furnace where the tubes are inclined rearwardly across the furnace to cooperate with refractory material 26 to form a major portion of the furnace roof 27. Thereafter, the tubes 24 are extended upwardly and forwardly to open to the drum 12. The front wall header 25 is connected for the flow of water from the downcomers 13 by means of the pipes 28.

The lower portion of the furnace rear wall 30 is similarly formed of tube and refractory construction and its tubes 31 have their lower end portions forwardly inclined and connected to a transverse inlet header 32 which is connected for water supply from the downcomers 13 by pipes 33. At a position intermediate the height of the furnace 10, the row of tubes 31 is bent out of the plane of the rear wall 30 toward the front wall to form a nose baffle 29 with the row of tubes 31 thereabove being returned to the plane of the rear wall 30. As shown particularly in Fig. 1A, the nose baffle 29 defines the furnace side of a triangular cross-section space 35. The rearward vertical side of the space includes tension tie members 36 between the spaced vertical portions of the wall 30 while the forward portion of the nose baffle formed by the bent tubes 31 has a refractory lining 37.

In forming the rear wall of the space 35, the tubes 31 are formed with bifurcated connections with stub tubes 38 extending downwardly from a position adjacent the junction 40 between the upper face of the nose baffle 29 and the plane of the wall 30. The stub tubes 38 end at a position upwardly adjacent the junction 41 between the lower face of the nose baffle 29 and the plane of the wall 30, and are provided with offset connections 42 of reduced cross-section with the tubes 31. The lower end of each of the stub tubes 38 is connected with a tube 31 by a hanger fitting 43 so that the entire weight of the rear wall 30 is supported from the top of the unit, and the rear surface defining the space 35 is water cooled. As shown, the rear wall of the space 35 forms a portion of the wall of the convection gas pass hereinafter described, and to form this wall the tubes 38 are provided with flat plates welded thereto to define a gas tight structure.

Above the nose baffle, the row of tubes 31 is extended vertically to a position below the roof 27. Above this position, a group of four adjacent tubes of the row are inclined forwardly in a common plane and are thereafter bent out of the inclined plane to form groups of four tubes 31A (see Fig. 3). The tubes of each group are in a row extending in a plane normal to the plane of the wall 30 and extending across the gas outlet 11 from the furnace 10. These groups of tubes form a screen across the gas outlet 11 so as to provide water cooled depositing surfaces for chemical constituents carried by the gases leaving the furnace 10 before those gases enter a downflow convection gas pass 44. The tubes 31A extend upwardly between the spaced tubes of roof 27 and connect into the drum 12.

Between the nose baffle 29 and the junction 40, and the lower portion of the screen formed by tubes 31A, the tubes 31 are provided with flat stud plates filling the intertube spaces so as to form a gas tight wall portion 45 along the rear of the furnace 10. The rear wall portion 45 between the nose baffle 29 and the screen formed by the tube rows 31A, forms in part the forward wall of the vertically elongated convection gas pass 44 which is arranged to receive the gases passing through the furnace outlet 11 and to direct those gases in a downward direction to a gas outlet 46 (see Fig. 1A) positioned in the lower portion of the downflow gas pass.

As shown in Figs. 1 and 1A, a plurality of transversely spaced platens involving aligned platens 47A, 47B and 47C, each comprising a row of tubes, are positioned in the uppermost portion of the furnace. The upper ends of the tubes of each group connect to chambers 48A, 48B and 48C of header 48, separated by diaphragms 50 and 51, and the chambers are connected to the steam and water drum by a plurality of tubes 52.

Lower portions of the platen tubes of each row are inclined toward the front wall 23, where they extend between spaced front wall tubes 24, to connect to upright water inlet headers 53, having compartments 53A, 53B and 53C separated by diaphragms 54 and 55.

A transverse header 56 supplied from downcomers 13 by pipes 57, has connections to compartments 53A and 53B by tubes 58 and by a direct connection 60 into the bottom of compartment 53C, whereby fluid circulation systems including the steam and water drum 12 are provided for each of the platens.

The rear tubes of platens 47C, at the elevation of the roof tubes 27, are spaced forwardly from the screen tubes 31A and extend vertically downward to the elevation of the forward edge of nose baffle 29, from whence they incline toward the front wall 23. Thus an unobstructed space 61 is provided between the rear edges of platens 47C and rear wall 31 between the elevation of the screen and the subjacent nose baffle. As the above mentioned rear tubes are also spaced from the forward edge of the nose baffle, an unobstructed space extends from the forwardly inclined tubes 31A of the screen downward so that any chemical deposit being shed from the screen, even when in chunks, may drop to the lower portion of the furnace without bridging any gaps between heat absorbing surfaces.

The forward tubes 61A, 61B and 61C of the respective rows of platens 47A, 47B and 47C, have offset bends 62A, 62B and 62C, which provide structural spacers contacting on wall tubes 24 in the case of 62A, and on the rear tubes of the respective platens 47A and 47B in the case of offsets 62B and 62C. The tubes of the platens are pendantly supported from the upper headers 48, and are connected at their lower ends to the upright headers 53. As the intermediate portions of the elongated platen tubes are without lateral support, vibrations thereof may be induced by gas flow and pressure conditions in the furnace, or if necessary the platens may be mechanically vibrated to assist in cleaning the tubes. Such mechanical vibrations may be applied to the offset 62A and will be transmitted to all the tubes of each platen through contact between the tubes.

The unit described is arranged for the incineration of residual waste liquor. As is customary in this type of construction, the water tube cooled bottom of the furnace 10 is inclined and provided with a protective coating of refractory material to form a hearth 34 for the reduction of the chemicals delivered thereto. The furnace hearth is provided with one or more smelt discharge spouts 39, associated with the front wall 23 of the furnace directing the smelt to a dissolving tank (not shown) for processing and reuse in the pulping process.

The residual liquor is introduced into the lower portion of the furnace 10, at a position upwardly spaced from the hearth by one or more spray nozzles 49. The liquor is injected through the front and rear walls of the furnace, so that the sprayed liquor is partially dehydrated in transit across the furnace 10. As the spray of liquor contacts the walls of the furnace, the liquor will cling thereto until the liquor is further dehydrated and the solids fall off the furnace wall to deposit on the hearth 34, as a char. As shown particularly in Fig. 1A, the lower portion of the furnace is provided with a row of air inlet ports 59 for the introduction of primary air. This air is delivered in controlled volume through the ports to impinge upon the bed of char accumulated in the bottom of the furnace. The volume of air introduced through the primary air ports is insufficient to complete the combustion of the combustible matter in the char, but with the combustion of some of the combustibles (under reducing condition) the inorganic chemicals of the char are smelted and passed through the smelt discharge spout 39.

Immediately above the primary air ports 59 is positioned a row of secondary air ports 59'. An additional quantity of air is introduced through these ports for substantially complete combustion of the solids and gaseous materials rising from the char bed in the bottom of the furnace. Tertiary air is added to the furnace through ports 69 in the front and rear walls of the furnace.

The gases rising in the upper portion of the furnace are deflected forwardly by the inclined wall portion 45 and turn to pass through the screen formed by the tubes 31A. Thereafter, the gases turn downwardly in space 44 into the convection pass of the unit.

The distinctive arrangement of pendant platen heat absorbing surface positioned as described in the upper portion of the furnace through which the gaseous products of combustion flow, is provided to cool the gases to a temperature such that chemical sublimates in the gases will condense on the heating surfaces within the furnace from whence they can fall to the hearth area for reduction to a smelt and subsequent discharge.

With the arrangement described, the extent of radiant heat absorbing surface provided by the platens 47 is substantially twice that of the furnace enclosing walls. This high ratio of heat absorbing platen surface to wall surface distributed throughout the rising stream of gaseous combustion products insures uniform cooling to a gas temperature of 1200 to 1300° F. at the furnace outlet 11.

The water cooled vertically extending platen and wall surfaces collect condensed chemical sublimates as well as residual chemical solids, which may result from gas entrained char particles carried upward from the char bed. Such collections of chemical solids are periodically shed from the bare water cooled surfaces of the platen tubes, and drop through the wide spaces between platens to the bottom of the furnace, where they become part of the smelt.

The downflow gas pass 44 in which the superheating of steam is accomplished, follows the upflow radiant heat transfer furnace 10. A gas turning space is situated in the upper portion of the gas pass 44 rearward of the screen tubes 31A, and horizontally extending steam superheater and feedwater economizer elements constitute the convection heat absorbing surfaces in the subjacent downflow gas pass, through which the gases flow to the outlet 46 which is connected to a liquor concentrator (not shown).

An enclosure for the turning space and the gas pass 44 is delineated by an inclined roof 63, rear wall 64, side walls 65 and 66, and a front wall 45 which is common with the furnace 10 for some distance below outlet 11. The roof and rear wall are lined with a row of tubes 67 receiving saturated steam from header 68, which has connections 70 to the steam space of drum 12. Tubes 71 and 72 lining the sidewalls are connected to headers 73 which receive saturated steam from the drum 12 through tubular connection 74. The lower ends of the row of rear wall tubes 67 and the lower ends of the rows of sidewall tubes 71 and 72 are all connected to discharge into the U-shaped header 75.

Supply connections 76 extend from header 75 to the lower inlet ends of multiple-loop elements of primary superheater 77. The upper outlet ends of the elements of the superheater 77 connect to a transverse header 78 which has external connections 80 to the inlet header 81 of an upwardly spaced secondary superheater 82.

With heating gases relatively free of solids flowing into the convection pass 44, and thence downward between the laterally spaced multiple loop elements, heat is first transmitted radiantly to the walls of the gas pass 44 and the steam flowing through its boundary wall tubes receives superheating heat thereby. Some additional heat may be received in the wall tubes 67, 71 and 72 in the lower portion of the pass so that the steam delivered from header 75 to superheater 77 will have its first stage of superheating. Sequential flow through the convection superheaters 77 and 82 in contra-flow relationship to the heating gases results in the delivery of relatively high temperature steam to the outlet header 83 and pipe 84, without imposing high temperature corrosive chemical conditions on the outer surfaces of the superheater tube walls.

Feedwater is supplied to the economizer inlet header 85, from which it flows through the tubular multiple loop economizer elements 86 to outlet header 87 and is thereafter directed by tubes 88 to inlet header 90 of a second economizer section 91. After being heated in the second section comprising two banks of multiple loop tubular elements connected in series, the heated feed water passes to the outlet header 92, from which pipes 93 discharge to the steam and water drum 12.

The walls of the downflow gas pass are extended below header 85 to delineate a gas turning space 94 above a hopper bottom 95. A gas outlet 46 in the upper portion of the rear wall of the space 94 is connected to a liquor concentrator (not shown). The hopper 95 has an outlet 96 through which cleaning shot and chemical dust accumulations are removable as disclosed in a copending application of L. W. Yoder, Serial No. 568,613, filed February 29, 1956.

As shown and claimed in said copending application, shot is transported from the lower to the upper portion of the unit by a gaseous lift medium and separated from the lift medium in one or more shot collecting devices 97. Thereafter, the shot is discharged downwardly under the influence of gravity to a row of shot distributors 98 positioned in the rear wall 64 of the convection gas-pass above the superheater banks 82. The separated lift medium is discharged through pipes 99 through the roof 63 of the convection gas-pass so that it mingles with the gases of combustion in passing through the unit.

While in accordance with the provisions of the statues we have illustrated and described herein the best form and mode of operation of the invention now known to us, those skilled in the art will understand that changes may be made in the form of the apparatus disclosed without departing from the spirit of the invention covered by our claims, and that certain features of our invention may sometimes be used to advantage without a corresponding use of other features.

What is claimed is:

1. Apparatus for the recovery of chemicals and heat from pulp residual liquor containing inorganic chemicals and combustible organic matter comprising upright fluid cooled walls defining a vertically elongated furnace chamber and having a hearth at the bottom and a heating gas outlet in the upper rear portion thereof, a vapor-liquid drum positioned above said furnace and connected in the fluid circulatory system of said fluid cooled walls, means for incinerating said residual liquor in the lower portion of said furnace chamber for the recovery of inorganic chemicals and the production of hot combustion products, a plurality of laterally spaced rows of fluid cooled tubes forming platens lying in upright planes in the upper forward portion of said furnace, means connecting said platens into the fluid circulatory system with said drum, some of the fluid cooled tubes of said rear wall inclined forwardly and upwardly in spaced relationship across said heating gas outlet to a position adjacent the rear of said platens to form a screen across said outlet, and an inwardly tapering nose baffle positioned above said hearth substantially at the level of the lower portion of said platens and extending forwardly adjacent the rear of said platens for directing gas flow into heat exchange contact with said platens, said baffle having an upper surface extending upwardly and rearwardly to the plane of the rear wall of the furnace to form a substantially unobstructed space in the rear upper portion of said furnace extending downwardly from said screen to the upper surface of said baffle and rearwardly bounded by the rear wall of said furnace and forwardly by the rearward edge of said platens for the gravitational movement of solids dislodged from said screen onto said baffle and thence into the lower portion of said furnace.

2. Apparatus according to claim 1 wherein upright vapor cooled walls define a convection gas pass having an upper gas inlet registering with the gas outlet from said furnace and a gas outlet in the lower end portion thereof, the gases entering said convection gas pass being cooled within said furnace to a temperature below 1300° F., a plurality of horizontally disposed fluid heating tubes positioned in said convection gas pass, and shot cleaning means for cleaning said horizontally disposed heating tubes.

References Cited in the file of this patent

UNITED STATES PATENTS

| | | |
|---|---|---|
| 2,067,671 | Kooistra | Jan. 12, 1937 |
| 2,293,040 | Bailey | Aug. 18, 1942 |
| 2,308,762 | Krug et al. | Jan. 19, 1943 |
| 2,313,251 | Marshall | Mar. 9, 1943 |
| 2,416,462 | Wilcoxson | Feb. 25, 1947 |
| 2,594,267 | Wilcoxson | Apr. 22, 1952 |
| 2,665,118 | Broman | Jan. 5, 1954 |